Patented June 28, 1949

2,474,758

UNITED STATES PATENT OFFICE 2,474,758

COMPLEX SALTS OF STREPTOTHRICIN

Robert L. Peck, Plainfield, N. J., assignor to Merck & Co., Inc., Rahway, N. J., a corporation of New Jersey No Drawing. Application August 24, 1945, Serial No. 612,558

14 Claims. (Cl. 260—236.5)

This invention relates to the preparation of new and therapeutically useful crystalline salts of streptothricin, particularly complex salts of streptothricin containing inorganic salts, and more particularly to the preparation of crystalline streptothricin complexes containing alkaline earth metal halides.

It has been shown by Waksman and Woodruff, Proc. Soc. (Exp. Biol. & Med. 49, 207-10 (1942) that streptothricin is obtained from elaboration products, formed in the cultivation of the microorganism A. lavendulae in a suitable culture medium, by adsorption on activated carbon followed by elution with an acidic solvent. Products, such as streptothricin hydrochloride which are thus obtained are in the form of crude concentrates having a potency generally less than 50 u./mg. (A unit of activity that amount of material which will inhibit the growth of a standard strain of Esherichia coli in one ml. of a suitable culture medium.)

Concentrates of greatly increased potency can be prepared by a process of selective adsorption and elution as described in a pending application by the present inventor Serial No. 601,337 filed June 23, 1945, and the preparation of a crystalline helianthine salt of streptothricin can be prepared as described in the pending application of his colleague Karl Folkers, Ser. No. 601,335 filed June 23, 1945. Streptothricin hydrochloride concentrates having an activity of the order of 600 or more u./mg., obtained by the process of adsorption and elution or by reconverting the helianthine salt to the hydrochloride, are of high purity and are therapeutically useful. These products however are not suitable for extensive use as they are not chemically pure compounds, susceptible to standardization by purely chemical tests, and must be standardized batch-by-batch by tests as to physiological activity.

It is now discovered according to the present invention that certain inorganic acid salts, particularly alkaline earth metal halides combine chemically with acid salts of streptothricin in a suitable solvent medium to form crystalline complex salts containing both the streptothricin acid salt and the inorganic acid salt. These complex salts are of high potency, and by recrystallization can be obtained in substantially pure form. The combined inorganic acid salt, being itself essentially non-toxic, does not impair the therapeutic value of the product. Thus for the first time streptothricin is available in a form which not only has valuable therapeutic properties but also can be produced, distributed, and administered in a practicable way.

In a companion application by the present applicant Ser. No. 612,557 filed August 24, 1945, now Patent No. 2,446,102, the preparation of complex salts of the closely related antibiotic substance, streptomycin, has been disclosed in considerable detail. Streptomycin and streptothricin are different substances as evidenced for example by their antibiotic specificity; by the difference in optical rotation of corresponding salts, i. e. streptomycin hydrochloride $$(\alpha)_D^{25} = -80°$$

(c., 1% in water) streptothricin hydrochloride $(\alpha)_D^{25} = -49°$ (c., 1% in water), (both based upon substantially pure salts dried in vacuo at about 25° C.); and by the difference in nitrogen content; i. e. streptomycin hydrochloride contains about 14% N, while streptothricin hydrochloride contains about 18% N. Despite these differences, however, the two substances react similarly in many chemical reactions; and it is found that complexes of a streptothricin acid salt and an alkaline earth metal salt are formed in the same manner as corresponding streptomycin complexes.

Regarded in certain of the broader aspects the novel features embodied in the present invention comprise streptothricin complex double salts consisting of an acid salt of streptothricin and an alkaline earth metal halide and the process for preparing the same by reacting a streptothricin acid salt with an alkali metal halide in a solvent medium and separating the complex salt thus formed by diminishing its solubility in the solvent medium and crystallizing out the substantially pure streptothricin complex salt. The solubility of the complex salt in the solvent medium can be diminished either by evaporating part of the solvent or by adding a miscible solvent in which the complex is only slightly soluble.

In preparing streptothricin complex salts according to the present invention acid salts of streptothricin of moderately high to high potency are preferably employed i. e. acid salts having an activity of the order of 300 u./mg. or higher. Acid salts having an activity or potency below about 300 u./mg. are generally so impure that it is difficult or impossible to recover a crystalline complex. Impure acid salts of this sort can easily be purified to a material having an activity of more than 300 u./mg. by one or more treatments with alumina as disclosed in application Ser. No. 601,337 above referred to.

The reaction between the streptothricin acid salt and an alkaline earth metal halide is effected in the presence of an organic solvent or an aqueous-organic, or organic solvent mixture, in which the streptothricin acid salt and the alkaline earth metal halide as well as for the resulting complex are freely soluble (i. e. one part of substance will dissolve in 1–10 parts of solvent). At the same time the selected solvent should not be one in which the complex is too highly soluble because of the difficulty in crystallizing the complex from such a solvent.

It has been found that the best single solvent to use in forming and recovering the crystalline complex is methanol, and that the best mixed solvents are aqueous-ethanol, and methanol-ethanol in the ratios of about 1:2 and 5:4 respectively. Other organic solvents such as propanol, isopropanol, and the like can be combined with either water or methanol to give mixed solvents having the desired solubility for the starting materials and final product as above described.

The complex salt formed in the reaction is separated from the solvent medium by diminishing the solubility of the complex salt in the solvent media and then crystallizing out the complex salt. This can be accomplished by evaporating part of the solvent preferably under reduced pressure, or by adding a miscible solvent in which the complex is only slightly soluble. By way of illustration, the solubility of the streptothricin hydrochloride-calcium chloride complex in methanol is about one part to five parts of methanol, whereas the solubility in ethanol is about one part to 100 parts of ethanol. By adding one or more parts by volume of ethanol to a methanol solution of the complex, preferably while heating the methanol solution to about 50° or 60° C. the solubility of the complex in the resulting solvent mixture is materially reduced and precipitation or crystallization of the complex takes place without evaporation of solvent. The complex salt obtained by either of the foregoing procedures can be readily purified by dissolving in a solvent or solvent mixture, not necessarily the same as that originally employed, and recrystallizing the product therefrom.

As starting materials various acid salts of streptothricin can be employed. Hydrohalides such as the hydrochloride, hydrobromide, and hydroiodide are most suitable although other acid salts and notably the helianthine salt of streptothricin can be used as well. These can be reacted with an alkaline earth metal halide such as calcium chloride, calcium bromide, strontium chloride, and the like by admixing at room temperature in a solvent of the type above described.

When a streptothricin hydrohalide is employed as the acid salt, it is added together with an alkaline earth metal halide to the selected solvent with stirring to effect complete solution. The resulting solution is then evaporated or concentrated to a volume such that crystallization of the complex salt takes place. Crystallization will generally commence when the solution contains of the order of 10–40% solids depending upon the particular solvent which is used. Evaporation or concentration can be effected in a partially evacuated (.5–.75 atmos.) dessicator over calcium chloride or by continuous evacuation under reduced pressure. Best crystallization is obtained by slow evaporation at pressures of .5–.75 atmos. but more rapid vacuum concentration at pressures of 30 mm. of mercury or lower does not impair the yield or quality of complex salt recovered.

After suitable concentration or evaporation the resulting solution of the complex salt is allowed to stand to permit maximum crystal formation. The crystals are then separated by filtration, washed with suitable solvents, such as methanol or a methanol-ethanol mixture followed by ethanol and dried, while the mother liquor can be further concentrated to yield additional crops of crystals. When the crystals thus formed are dried at 25° C. in vacuo they contain some alcohol of crystallization. When dried to constant weight at 100° C. in vacuo however, this alcohol of crystallization is removed and pure complex salt is obtained.

The complex salts are very hygroscopic and it is therefore difficult to obtain characteristic melting points. The melting points appear to be of the order 225° C. with decomposition. The complex salts are optically active however and the optical rotation serves as a good measure of the purity of the products. Thus essentially pure streptothricin hydrochloride-calcium chloride complex, after crystallization from methanol-ethanol and drying at 100° C. in vacuo has a rotation, $(\alpha)_D^{25} = -46.5°$ (c. 0.95% in water) and an activity of about 700 u./mg.

When the helianthine salt of streptothricin is employed as a starting material an amount of calcium chloride or the like is used which is sufficient to first react with the streptothricin salt to form insoluble calcium helianthate and streptothricin hydrochloride and then to form the calcium chloride complex. The insoluble calcium helianthate is filtered off and the filtrate is then evaporated to suitable volume to crystallize out the complex in the manner previously described.

While it has been indicated that the starting streptothricin acid salt should have an activity of about 300 u./mg. or higher, it should be noted that variations in potency above 300 u./mg. do not affect appreciably the purity of crystalline product obtained.

The following examples illustrate methods of carrying out the present invention, but it is to be understood that these examples are given by way of illustration and not of limitation.

*Example I*

About 450 mg. of crystalline streptothricin helianthate is treated with about 50 mg. of calcium chloride in about 20 cc. of methanol. One drop of concentrated hydrochloric acid is added and the mixture is filtered through activated charcoal. A part of the filtrate is concentrated under reduced pressure (about .75 atmos.) to a volume of about 2 cc. and allowed to stand at room temperature (about 28°) overnight. The crystals which form are separated by centrifugation, washed with 1:2 methanol-ethanol mixture and with ethanol and dried in vacuo at 25° C. The crystals of streptothricin hydrochloride-calcium chloride complex salt thus obtained have a rotation $(\alpha)_D = -36°$ (c. 0.96% in water), and an activity of about 650 u./mg. Calcium is present in the crystals as shown by formation of calcium sulfate on decomposing the complex with sulfuric acid.

*Example II*

About 176 mg. of streptothricin hydrochloride $(\alpha)_D = -47.6°$ (in water; sample dried at 25° in vacuo), activity about 750 u./mg., is dissolved in 2 cc. of methanol and treated with about 75 mg. of calcium chloride in 1.5 cc. of methanol. Evaporation of part of the solvent causes separation of crystals. The crystals were rather soluble in methanol so that only a small fraction is separated at this stage. To the supernatant solution is added more methanol and about one third volume of ethanol and the solution is evaporated to remove part of the methanol. Separation of crystals is fairly rapid, a crop of 40 mg. being taken after the partly concentrated solution, about 4 cc., has stood for about three hours. These crystals of streptothricin hydrochloride-calcium chloride complex salt are dried in vacuo at 100° for 2 hours. The complex then shows a rotation $(a)_D = -46.5°$ (c., 0.95 in water), and an activity of about 700 u./mg. of streptothricin hydrochloride-calcium chloride complex salt. Calcium is present in the crystals as shown by formation of calcium sulfate on decomposing with sulfuric acid.

Modifications may be made in carrying out the present invention without departing from the spirit and scope thereof and the invention is to be limited only by the appended claims.

What is claimed is:

1. As a new composition of matter a streptothricin complex double salt consisting of an acid salt of streptothricin and an alkaline earth metal halide.

2. As a new composition of matter a streptothricin complex double salt consisting of a streptothricin hydrohalide and a calcium halide.

3. As a new composition of matter a streptothricin complex double salt consisting of an acid salt of streptothricin and a calcium halide.

4. The streptothricin hydrochloride - calcium chloride complex salt.

5. The process for preparing complex salts consisting of a streptothricin acid salt and an alkaline earth metal halide that comprises reacting a streptothricin acid salt with an alkaline earth metal halide in a solvent medium in which these reactants and the corresponding complex salt are freely soluble, and separating the complex salt thus formed by changing the relative proportion of the solvent in the total liquid mass and crystallizing out the substantially pure streptothricin complex salt.

6. The process for preparing complex salts consisting of a streptothricin acid salt and an alkaline earth metal halide that comprises reacting a streptothricin acid salt with an alkaline earth metal halide in a solvent medium in which these reactants and the corresponding complex salt are freely soluble, evaporating off at least part of said solvent, and crystallizing out substantially pure streptothricin complex salt.

7. The process for preparing complex salts consisting of a streptothricin acid salt and an alkaline earth metal halide that comprises reacting a streptothricin acid salt with an alkaline earth metal halide in a solvent medium in which these reactants and the corresponding complex salt are freely soluble, evaporating off at least part of said solvent under reduced pressure, and crystallizing out substantially pure streptothricin complex salt.

8. The process for preparing complex salts consisting of a streptothricin acid salt and an alkaline earth metal halide that comprises reacting a streptothricin acid salt with an alkaline earth metal halide in a solvent medium in which these reactants and the corresponding complex salt are freely soluble, adding to the solution thus obtained a miscible solvent in which the complex is only slightly soluble, and crystallizing out substantially pure streptothricin complex salt.

9. The process for preparing a substantially pure complex salt consisting of a streptothricin acid salt and an alkaline earth metal halide that comprises reacting a streptothricin acid salt with an alkaline earth metal halide in a solvent medium in which these reactants and the corresponding complex salt are freely soluble, separating the complex salt thus formed by changing the relative proportion of the solvent in the total liquid mass to diminish the solubility of the complex salt therein and crystallizing out the substantially pure streptothricin complex salt, recrystallizing the complex salt from a solvent of the class described and drying the crystalline product thus obtained to constant weight in vacuo at about 100° C.

10. The process for preparing complex salts consisting of a streptothricin acid salt and an alkaline earth metal halide that comprises reacting a streptothricin acid salt with an alkaline earth metal halide in methanol evaporating off at least part of the methanol, and crystallizing out substantially pure streptothricin complex salt.

11. The process for preparing complex salts consisting of a streptothricin acid salt and an alkaline earth metal halide that comprises reacting a streptothricin acid salt with an alkaline earth metal halide in an aqueous-lower aliphatic alcohol solvent mixture, evaporating off at least part of said solvent mixture, and crystallizing out substantially pure streptothricin complex salt.

12. The process for preparing complex salts consisting of a streptothricin acid salt and an alkaline earth metal halide that comprises reacting a streptothricin acid salt with an alkaline earth metal halide in an aqueous-ethanol solvent mixture, evaporating off at least part of said solvent mixture and crystallizing out substantially pure streptothricin complex salt.

13. The process for preparing complex salts consisting of a streptothricin hydrohalide and an alkaline earth metal halide that comprises reacting a streptothricin hydrohalide with an alkaline earth metal halide in a solvent medium in which these reactants and the corresponding complex salt are freely soluble, and separating the complex salt thus formed by changing the relative proportion of the solvent in the total liquid mass and crystallizing out the substantially pure streptothricin complex salt.

14. The process for preparing the streptothricin hydrochloride-calcium chloride complex salt that comprises reacting streptothricin hydrochloride with calcium chloride in a solvent medium in which these reactants and the complex salt are freely soluble, and separating the complex salt thus formed by changing the relative proportion of the solvent in the total liquid mass and crystallizing out the substantially pure streptothricin complex salt.

ROBERT L. PECK.

No references cited.